(12) United States Patent
Togawa

(10) Patent No.: US 11,221,904 B2
(45) Date of Patent: Jan. 11, 2022

(54) LOG ANALYSIS SYSTEM, LOG ANALYSIS METHOD, AND LOG ANALYSIS PROGRAM

(71) Applicant: NEC CORPORATION, Tokyo (JP)

(72) Inventor: Ryosuke Togawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 889 days.

(21) Appl. No.: 15/780,284

(22) PCT Filed: Dec. 19, 2016

(86) PCT No.: PCT/JP2016/005182
§ 371 (c)(1),
(2) Date: May 31, 2018

(87) PCT Pub. No.: WO2017/115458
PCT Pub. Date: Jul. 6, 2017

(65) Prior Publication Data
US 2018/0349801 A1 Dec. 6, 2018

(30) Foreign Application Priority Data
Dec. 28, 2015 (JP) .............................. JP2015-255981

(51) Int. Cl.
*G06F 11/07* (2006.01)

(52) U.S. Cl.
CPC ........ *G06F 11/079* (2013.01); *G06F 11/0706* (2013.01); *G06F 2201/835* (2013.01)

(58) Field of Classification Search
CPC ............. G06F 11/0706; G06F 11/0751; G06F 11/079; G06F 2201/835
See application file for complete search history.

(56) References Cited

U.S. PATENT DOCUMENTS 7,613,576 B2 * 11/2009 Gross ..................... G06F 11/00 324/628
9,558,053 B1 * 1/2017 McClintock ........ G06F 11/3003

FOREIGN PATENT DOCUMENTS

| JP | 2005-151289 A | 6/2005 |
| JP | 2010-134862 A | 6/2010 |
| JP | 2014-153721 A | 8/2014 |

OTHER PUBLICATIONS

International Search Report of PCT/JP2016/005182 filed Mar. 7, 2017.

* cited by examiner

*Primary Examiner* — Joseph R Kudirka
(74) *Attorney, Agent, or Firm* — Sughrue Mion, PLLC

(57) ABSTRACT

A log analysis system according to of the present invention is a log analysis system for performing analysis of an analysis target log including a periodic log output at a cycle, the log analysis system including: a form determination unit that determines a form of each of logs included in the analysis target log; a temporal distribution acquisition unit that aggregates a temporal frequency of appearance of the logs for each form; a cycle determination unit that determines the cycle for each form based on the temporal frequency of appearance; and a model learning unit that extracts, out of the logs, a log which is included in a time range including the cycle as the periodic log for each form and, based on the form and the cycle of the periodic log, generates information used as a reference as to whether or not the log is abnormal.

8 Claims, 12 Drawing Sheets

FIG.2A

| LOG |
|---|
| 2015/08/17 08:27:18 [SV003] JNW P082 started |
| 2015/08/17 08:28:37 [SV002] Request to SV003 was timeout |
| 2015/08/17 08:29:30 [SV002] Request to SV003 was timeout |
| 2015/08/17 08:29:59 [SV002] CPU usage exceeded threshold [192.168.1.23] |
| 2015/08/17 08:30:37 [SV001] JNW 3258 started |
| ⋮ |

FIG.2B

| Format ID | Format |
|---|---|
| 039 | <variable: timestamp> [<variable: character string>] JNW <variable: number> started |
| 071 | <variable: timestamp> [<variable: character string>] JNW <variable: number> ended |
| 144 | <variable: timestamp> [PF] Anomaly occurred in alive monitoring [<variable: IP>] |
| 223 | <variable: timestamp> [<variable: character string>] CPU usage exceeded threshold [<variable: IP>] |
| 585 | <variable: timestamp> [SV002] Request to SV003 was timeout |

FIG.5A

| FORMAT ID | CYCLE | MARGIN TIME |
|---|---|---|
| 039 | 1 HOUR | 10 MINUTES |
| 039 | 1 DAY | 30 MINUTES |
| 071 | 1 HOUR | 10 MINUTES |
| 144 | 1 DAY | 30 MINUTES |
| 223 | OTHER | — |
| ⋮ | | |

FIG.5B

| MODEL ID | FORMAT ID | CYCLE | MARGIN TIME |
|---|---|---|---|
| 1 | 039 | 1 DAY | 30 MINUTES |
| 2 | 039, 071 | 1 HOUR | 10 MINUTES |
| 3 | 144 | 1 DAY | 30 MINUTES |
| 4 | 344, 345, 346 | 1 WEEK | 60 MINUTES |
| ⋮ | | | |

FIG.6A

| FORMAT ID | TIME | TIME DIFFERENCE |
|---|---|---|
| 344 | 2015/08/17 10:01:45 | 0 MINUTES |
| 345 | 2015/08/17 10:27:01 | +26 MINUTES |

FIG.6B

| FORMAT ID | TIME | TIME DIFFERENCE |
|---|---|---|
| 344 | 2015/08/17 10:01:45 | 0 MINUTES |
| 345 | 2015/08/17 10:27:01 | +26 MINUTES |
| 346 | 2015/08/17 11:06:32 | +65 MINUTES |

FIG.6C

| FORMAT ID | TIME | TIME DIFFERENCE |
|---|---|---|
| 039 | 2015/08/17 08:27:18 | 0 MINUTES |
| 071 | 2015/08/17 08:36:01 | +9 MINUTES |
| 039 | 2015/08/17 09:25:12 | +58 MINUTES |

FIG.7

| LOG | FORMAT ID | ANOMALY DETAIL |
|---|---|---|
| 2015/08/17 08:27:18 [SV003] JNW P082 started | 039 | |
| 2015/08/17 08:36:01 [SV003] JNW P082 ended | 071 | Repetition anomaly Format ID: 039, 071 Cycle: 1 hour (±10 minutes) |
| 2015/08/17 09:25:12 [SV003] JNW P082 started | 039 | |

LOG ANALYSIS SYSTEM, LOG ANALYSIS METHOD, AND LOG ANALYSIS PROGRAM

CROSS REFERENCE TO RELATED APPLICATIONS

This application is a National Stage of International Application PCT/JP/2016/005182 filed Dec. 19, 2016, claiming priority based on Japanese Patent Application No. 2015-255981 filed Dec. 28, 2015, the disclosure of which is incorporated herein in its entirety by reference.

TECHNICAL FIELD

The present invention relates to a log analysis system, a log analysis method, and a log analysis program for performing log analysis.

BACKGROUND ART

In general, in a system executed on a computer, logs each including a result of an event, a message, or the like are output from a plurality of devices and programs. A log analysis system detects an abnormal log from the output logs in accordance with a predetermined standard and outputs the detected log as an abnormal log to a user (operator or the like).

Logs include a log that is periodically output. The periodic output means being output at a certain time period such as every hour, every day, every week, or every month, for example. When a log to be periodically output is not output at an expected time or when the output time is delayed, there may be an anomaly occurring in a system. Thus, a log analysis system may perform detection of an anomaly based on the periodicity of logs.

Patent Literature 1 discloses an art that filters logs based on a change in the frequency of logs (log template) every predetermined time. For example, the art of Patent Literature 1 acquires information that a change between the frequency of logs on a day and the frequency of logs on another day is large or small and is able to filter logs based thereon.

CITATION LIST

Patent Literature

PTL 1: Japanese Patent Application Publication No. 2014-153721

SUMMARY OF INVENTION

Due to a change in traffic, a processed object, or the like, however, the output time of a log may vary even when the log is periodic. In other words, the periodicity of a log fluctuates. When the time the log is output is simply used as a cycle, fluctuation of periodicity cannot be considered. Thus, a log of originally the same cycle may be determined as a log of another cycle. Further, even when the type of logs is the same, some may be output at different cycles, and others may be output in an aperiodic manner.

The art of Patent Literature 1 aggregates the frequency of a particular type of logs every predetermined time period and calculates a fluctuation coefficient thereof. Thus, when logs of the same type are output at different cycles or output in an aperiodic manner, the art of Patent Literature 1 cannot separate these cases. Further, since there is no consideration on fluctuation of the periodicity of logs in the art of Patent Literature 1, when the time a log is output varies, the periodicity of logs cannot be correctly determined.

The present invention has been made to address the above problems and intends to provide a log analysis system, a log analysis method, and a log analysis program that can analyze logs taking various periodicity and fluctuation of logs into consideration.

A first example aspect of the present invention is a log analysis system for performing analysis of an analysis target log including a periodic log output at a cycle, and the log analysis system includes: a form determination unit that determines a form of each of logs included in the analysis target log; a temporal distribution acquisition unit that aggregates a temporal frequency of appearance of the logs for each form; a cycle determination unit that determines the cycle for each form based on the temporal frequency of appearance; and a learning unit that extracts, out of the logs, a log which is included in a time range including the cycle as the periodic for each form and, based on the form and the cycle of the periodic log, and generates information used as a reference as to whether or not the log is abnormal.

A second example aspect of the present invention is a log analysis method for performing analysis of an analysis target log including a periodic log output at a cycle, and the log analysis method includes: determining a form of each of logs included in the analysis target log; aggregating a temporal frequency of appearance of the logs for each form; determining the cycle for each form based on the temporal frequency of appearance; and extracting, out of the logs, a log which is included in a time range including the cycle as the periodic log for each form and, based on the form and the cycle of the periodic log, generates information used as a reference as to whether or not the log is abnormal.

A third example aspect of the present invention is a log analysis program for performing analysis of an analysis target log including a periodic log output at a cycle, and the log analysis program causes a computer to perform: determining a form of each of logs included in the analysis target log; aggregating a temporal frequency of appearance of the logs for each form; determining the cycle for each form based on the temporal frequency of appearance; and extracting, out of the logs, a log which is included in a time range including the cycle as the periodic log for each form and, based on the form and the cycle of the periodic log, generates information used as a reference as to whether or not the log is abnormal.

A fourth example aspect of the present invention is a log analysis system for performing analysis of an analysis target log including a periodic log output at a cycle, and the log analysis system includes: a storage unit that records information including a form determined from the periodic log included in a time range including the cycle and the cycle; a log anomaly analysis unit that determines whether or not a log to be determined is abnormal based on the information including the form and the cycle recorded in the storage unit; and an output unit that outputs a determination result obtained by the log anomaly analysis unit.

According to the present invention, it is possible to generate information used as a reference of anomaly determination and perform log analysis based on a cycle obtained by taking fluctuation into consideration for each format of a log.

BRIEF DESCRIPTION OF DRAWINGS

FIG. 2A is a schematic diagram of an analysis target log according to the first example embodiment.

FIG. 2B is a schematic diagram of a format according to the first example embodiment.

FIG. 5A is a schematic diagram of cycle information acquired by a cycle determination unit according to the first example embodiment.

FIG. 5B is a schematic diagram of model information generated by a model leaning unit according to the first example embodiment.

FIG. 6A is a schematic diagram of an abnormal log determined by a log anomaly analysis unit according to the first example embodiment.

FIG. 6B is a schematic diagram of an abnormal log determined by a log anomaly analysis unit according to the first example embodiment.

FIG. 6C is a schematic diagram of an abnormal log determined by a log anomaly analysis unit according to the first example embodiment.

FIG. 7 is a schematic diagram illustrating a display window of an anomaly determination result according to the first example embodiment.

DESCRIPTION OF EMBODIMENTS

Figure 1:
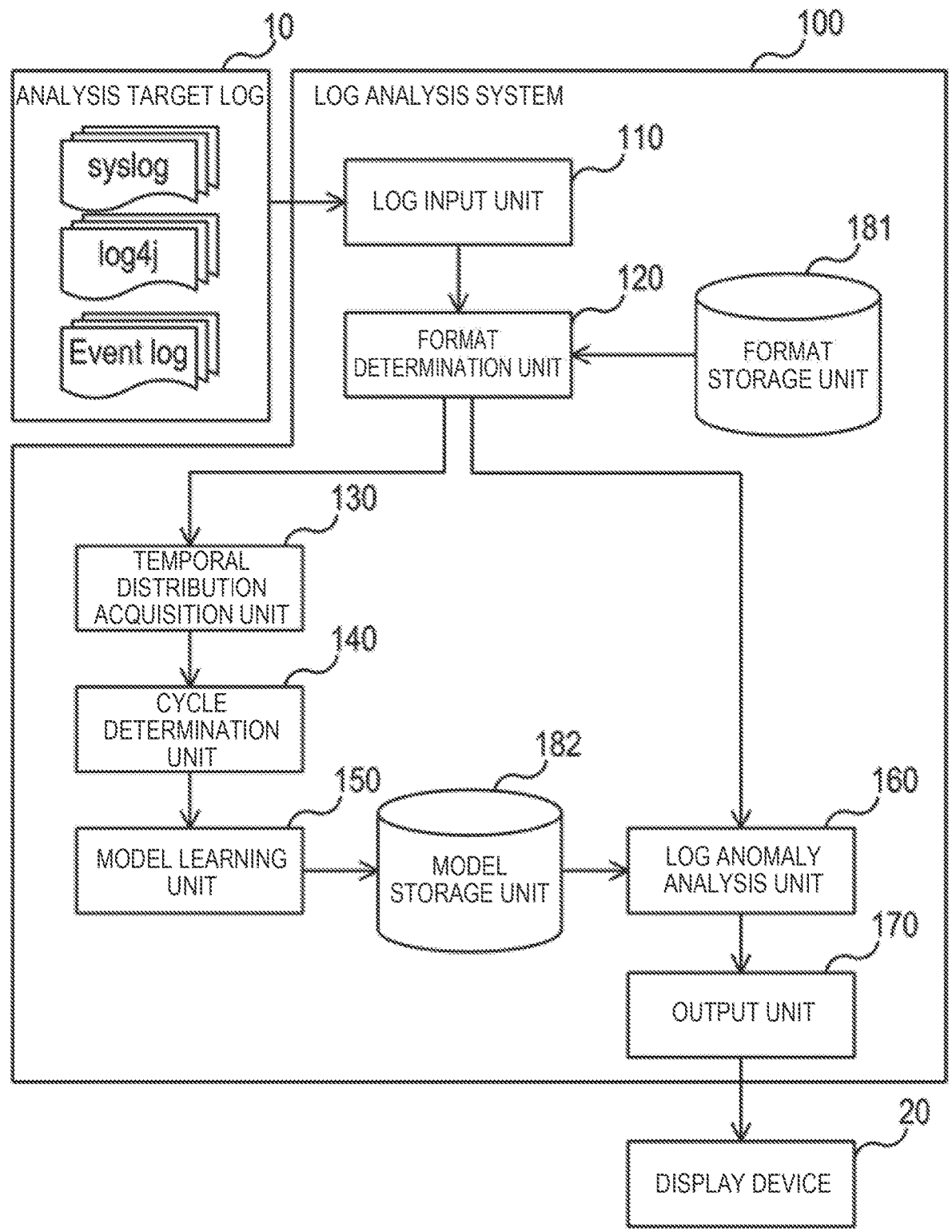
FIG. 1 is a block diagram of a log analysis system according to a first example embodiment.

While example embodiments of the present invention will be described below with reference to the drawings, the present invention is not limited to these example embodiments. Note that, in the drawings described below, those having the same function are labeled with the same reference, and the duplicated description thereof may be omitted.

First Example Embodiment

FIG. 1 is a block diagram of a log analysis system 100 according to the present example embodiment. In FIG. 1, the arrows indicate main data flows, and there may be other data flows than is illustrated in FIG. 1. In FIG. 1, each block illustrates a configuration of a function unit rather than a configuration as a unit of hardware (device). Thus, each block illustrated in FIG. 1 may be implemented within a single device or may be implemented separately in multiple devices. Data transaction among blocks may be performed via any means such as a data bus, a network, a portable storage medium, or the like.

The log analysis system 100 has a log input unit 110, a format determination unit 120, a temporal distribution acquisition unit 130, a cycle determination unit 140, a model learning unit 150, a log anomaly analysis unit 160, and an output unit 170 as a processing unit. Further, the log analysis system 100 has a format storage unit 181 and a model storage unit 182 as a storage unit.

The log input unit 110 acquires an analysis target log 10 to be learned or analyzed and inputs the analysis target log 10 to the log analysis system 100. The analysis target log 10 may be acquired from the outside of the log analysis system 100 or may be acquired by reading those recorded in advance inside the log analysis system 100. The analysis target log 10 includes one or more logs output from one or more devices or programs. The analysis target log 10 is a log that is represented in any data form (file form), which may be binary data or text data, for example. Further, the analysis target log 10 may be recorded as a table of a database or may be recorded as a text file.

FIG. 2A is a schematic diagram of an exemplary analysis target log 10. The analysis target log 10 in the present example embodiment includes one or more any number of logs in a unit of a single log output from a device or a program. A log may be a single row of a character string or multiple rows of character strings. That is, the analysis target log 10 designates the whole logs included in the analysis target log 10, and a log denotes a single log picked out from the analysis target log 10. Each log includes a timestamp indicating time, a message indicating content of the log, and the like. In the log analysis system 100, a broad range of types of logs can be a target of analysis without being limited to a particular type of logs. For example, logs such as a syslog, an event log, or the like that record a message output from operating system can be used as the analysis target log 10.

The format determination unit 120 is a form determination unit that determines which format prerecorded in the format storage unit 181 each log included in the analysis target log 10 conforms to and that uses the conforming format to separate each log into a variable part and a constant part. A format is a form of a log that is predetermined based on a log property. A log property includes such a nature that is likely or unlikely to vary among logs that are similar to each other, or such a nature that a character string which can be seen as a part that is likely to vary is described in a log. A variable part is a changeable part in a format of a log, and a constant part is unchanging part in a format of a log. A value (including a number, a character string, and other data) of a variable part in the input log is referred to as a variable value. The variable part and the constant part are different among each format. Thus, a part defined as a variable part in a format may be defined as a constant part in another format, and vice versa. In the present example embodiment, since log analysis is performed by using a format determined based on a nature of a log as discussed above, it is possible to perform log analysis even with little knowledge of individual logs.

FIG. 2B is a schematic diagram of an exemplary format recorded in the format storage unit 181. A format includes a character string representing a format associated with a format ID that is a unique identifier. The format defines a variable part by describing a predetermined identifier in the changeable part of a log and defines a part other than the variable part of the log as a constant part. As an identifier of a variable part, for example, "<variable: timestamp>" indicates a variable part representing a timestamp, "<variable: character string>" indicates a variable part representing any character string, "<variable: number>" indicates a variable part representing any number, and "<variable: IP>" indicates a variable part representing any IP address. An identifier of a variable part is not limited to the above and may be defined by any method such as normalized expression, a list of possible values, or the like. Further, a format may be formed of only the constant part without including a variable part or may be formed of only the variable part without including a constant part.

For example, the format determination unit 120 determines that a log on the fifth row of FIG. 2A conforms to a format whose ID is 223 in FIG. 2B. The format determination unit 120 then processes the log based on the determined format and determines the timestamp "2015/08/17 08:29:59", the character string "SV002", and the IP address "192.168.1.23" as variable values.

While represented by a list of character strings for better visibility in FIG. 2B, a format may be represented in any data form (file form), and may be binary data or text data, for example. Further, a format may be recorded in the format storage unit 181 as a text file or may be recorded in the format storage unit 181 as a table of a database.

The temporal distribution acquisition unit 130 acquires temporal distribution data of logs for each format from the analysis target log 10 whose format has been determined by the format determination unit 120. Specifically, the temporal distribution acquisition unit 130 classifies logs included in the analysis target log 10 whose format has been determined by the format determination unit 120 for each format (format ID). Based on the timestamp of the log for each format, the temporal distribution acquisition unit 130 then aggregates the frequency of appearance of a log in each predetermined time span (for example, 10 minutes), that is, the number of times which a log appears in each predetermined time span. The temporal distribution acquisition unit 130 acquires the frequency of appearance of a log aggregated in such a temporal manner as temporal distribution data of the log.

Alternatively, the temporal distribution acquisition unit 130 acquires temporal distribution data of logs for each combination of a format and any variable value included in the log from the analysis target log whose format has been determined by the format determination unit 120. Specifically, the temporal distribution acquisition unit 130 classifies logs included in the analysis target log 10 whose format has been determined by the format determination unit 120 for each format (format ID). Subsequently, the temporal distribution acquisition unit 130 further classifies the logs based on any variable values included in a format. For example, in the logs determined to have a format 001, when there are logs including a variable value of Server001 and a variable value of Server002, they may be classified into a format 001 (Server001) and a format 001 (Server002). Note that the classification is an example and may be defined in any way as long as classification of logs can be identified for each combination of a format and a variable value. Further, the variable value means one or more variable values included in a log. That is, the variable value may be a combination of a plurality of variable values. Furthermore, a human may select the variable values for each format, or it may be configured such that the variable value is automatically selected according to a predetermined condition defined in advance. Next, in a similar manner to the case of classification for each format, the temporal distribution acquisition unit 130 acquires a temporarily aggregated frequency of appearance of a log as temporal data of a log for each combination of a format and a variable value. In the following, a format in the text means either a format or a combination of a format and one or more variable values included in the format.

Figure 3:
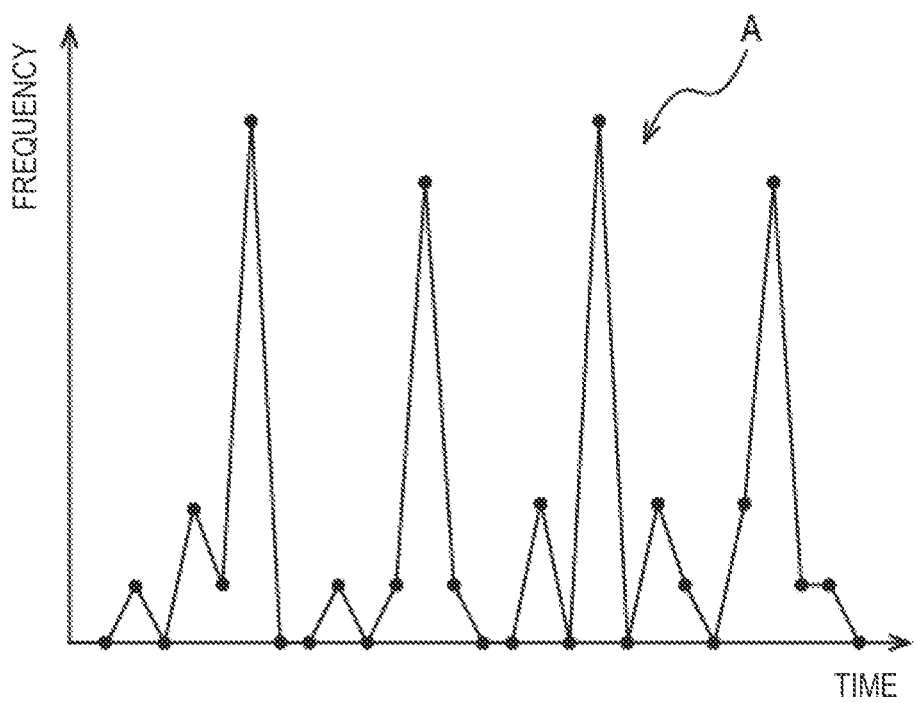
FIG. 3 is a diagram illustrating a graph of a temporal distribution of logs according to the first example embodiment.

FIG. 3 is a diagram illustrating a graph of an exemplary temporal distribution A of a log. The horizontal axis of the graph of FIG. 3 represents time, and the vertical axis represents frequency of appearance. The temporal distribution A is aggregated for each format by the temporal distribution acquisition unit 130. In the case of a format having periodicity, the frequency of appearance increases at particular time intervals as illustrated in FIG. 3. While represented using a graph for a better visibility, the temporal distribution A may be any form of data that can associate time with a frequency of appearance for each format.

The cycle determination unit 140 determines the cycle of logs for each format from a temporal distribution of a log acquired by the temporal distribution acquisition unit 130. Specifically, first, the cycle determination unit 140 applies a known frequency analysis scheme such as Fast Fourier Transform (FFT) to a temporal distribution (that is, a function of time) of a log of a format acquired by the temporal distribution acquisition unit 130 to convert it into a frequency distribution (that is, a function of frequency).

The cycle determination unit 140 then extracts a distinctive frequency component from the frequency distribution obtained by FFT and converts the frequency component into time. The cycle determination unit 140 then determines the time obtained from the distinctive frequency component as a cycle of the log of that format. The distinctive frequency component is the center frequency in a peak whose intensity is above a predetermined threshold or whose relative intensity compared to a peripheral part is above a predetermined threshold, for example. Further, the cycle determination unit 140 determines a part other than the distinctive frequency component in a frequency distribution as other distributions having no periodicity. Note that there may be one or more cycles or there may be no cycle in a temporal distribution of a log of one format. The cycle determination unit 140 acquires, as cycle information, a cycle determined for each format (alternatively, for each combination of a format and a variable value) as above.

Figure 4:
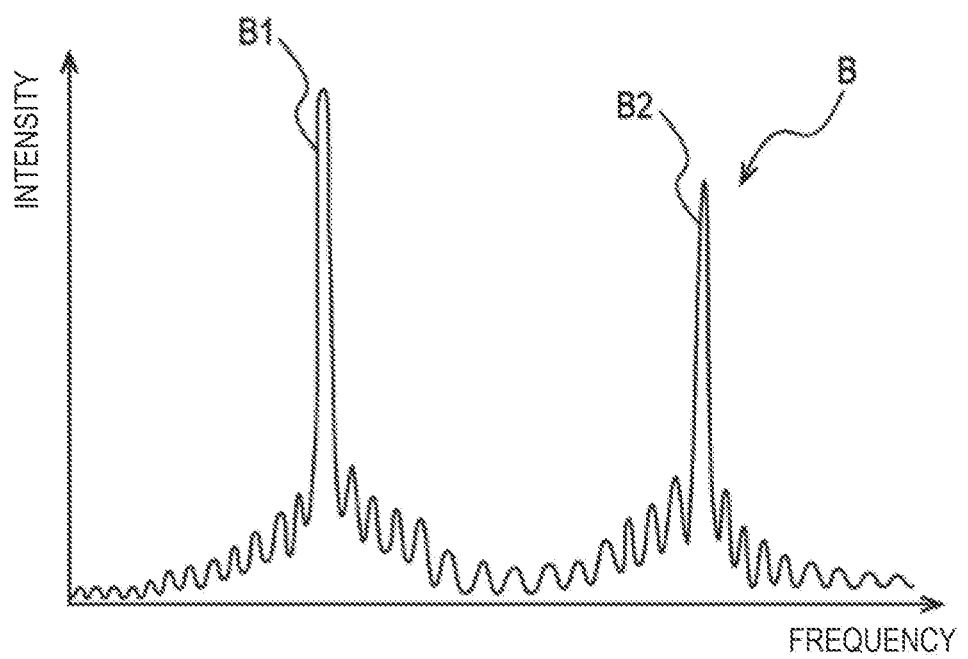
FIG. 4 is a diagram illustrating a graph of a frequency distribution according to the first example embodiment.

FIG. 4 is a diagram illustrating a graph of an exemplary frequency distribution B. The horizontal axis of the graph of FIG. 4 represents frequency, and the vertical axis represents intensity. The frequency distribution B is acquired for each format by the cycle determination unit 140. In FIG. 4, the frequency distribution B includes two large peaks B1 and B2, and these peaks B1 and B2 can be regarded as distinctive frequency components. For example, conversion of the center frequency of the peak B1 into time results in a cycle of one hour, and conversion of the center frequency of the peak B2 into time results in a cycle of one day. Therefore, the cycle determination unit 140 determines that the temporal distribution of a log that has caused the frequency distribution B of FIG. 4 includes two cycles, namely, one hour and one day.

FIG. 5A is a schematic diagram illustrating exemplary cycle information acquired by the cycle determination unit 140. The cycle information includes a format ID included in the analysis target log 10, a cycle of each format ID determined by the cycle determination unit 140, and margin time indicating periodicity fluctuation. The cycle information records one or more cycles for each format ID. Further, the cycle information records a cycle of "other" for a format ID whose cycle has not been determined by the cycle determination unit 140. The margin time represents a tolerance range of periodicity fluctuation and is set in accordance with a rule determined in advance. For example, the margin time is set to 10 minutes when the cycle is less than one day, 30 minutes when the cycle is greater than or equal to one day and less than one week, and 60 minutes when the cycle is greater than or equal to one week. Further, the margin time may be set by using a ratio to a cycle (for example, 10% of a cycle).

The cycle information illustrated in FIG. 5A is an example and may be recorded in any form. While represented by a list of character strings for a better visibility in FIG. 5A, the cycle information may be represented in any data form (file form), which may be binary data or text data, for example. Further, the cycle information may be separately recorded in a plurality of files or tables.

The method of determining and acquiring a cycle from a temporal distribution of a log is not limited to the method using FFT but may be any method that can determine a cycle from a temporal frequency distribution. For example, the cycle of a log may be acquired directly from a temporal distribution by identifying, as a cycle, time intervals of peaks of a frequency of appearance that repeatedly appears in the temporal distribution of a log.

The model learning unit 150 generates a model used for anomaly determination of a log based on cycle information acquired by the cycle determination unit 140 and records it in the model storage unit 182. A model is a definition of normal behavior of a log. In other words, a model is information that is a reference based on which it is determined whether or not a log to be determined is abnormal. In anomaly analysis, when a log to be determined does not conform to a model, it can be determined to be abnormal. The log anomaly analysis unit 160 described later performs determination of an abnormal log based on whether or not a log to be determined conforms to any model recorded in the model storage unit 182.

Specifically, first, the model learning unit 150 classifies logs of the analysis target log 10 whose format has been determined by the format determination unit 120 for each format. The model learning unit 150 then acquires the cycle and the margin time from the cycle determination unit 140 for each format. The model learning unit 150 then extracts, as a log having a periodicity (periodic log), a log in the analysis target log 10 included in a time range including a cycle for each format. More specifically, the model learning unit 150 extracts, as a periodic log for each format, a log of the analysis target log 10 included in a range in which the time resulted by subtracting the margin time from the time at the cycle is the earlier limit and the time resulted by adding the martin time to the time at the cycle is the later limit. Thereby, even when the periodicity has fluctuation, a log not strictly matching a cycle can be extracted as a periodic log.

A log not extracted as a periodic log by the model learning unit 150 is classified into other logs (referred to as a general log). In the following, a model generated based on a periodic log having periodicity is referred to as a cycle model, and a model generated based on a general log having no periodicity is referred to as a general model.

Next, the model learning unit 150 generates a cycle model based on a periodic log according to one format. Since a model is generated here based on one format and the cycle thereof, a cycle model generated in such a way is referred to as a simple model. The model learning unit 150 records a cycle and a margin time for each format in the model storage unit 182 as a simple model. In addition to a cycle and a margin time for each format, a property (for example, a variable value included in a periodic log) of a periodic log corresponding to the format may be used for the definition of a simple model.

Next, the model learning unit 150 generates a cycle model based on periodic logs according to a plurality of formats. Since a model is generated here based on two or more formats and the cycles thereof, a cycle model generated in such a way is referred to as a combination model. The model learning unit 150 extracts, out of periodic logs, a group of two or more formats in which the cycles are the same and the correlation of the temporal distributions of the frequency of appearance is above a predetermined threshold. In the present example embodiment, the correlation is a correlation coefficient calculated among temporal distributions of the frequency of appearance. Without being limited thereto, the correlation may be calculated by any other methods. The threshold of the correlation may be predetermined through an experiment, a simulation, or the like.

The model learning unit 150 records the cycle and the margin time of a group of two or more formats in which the cycles are the same and the correlation is above a predetermined threshold in the model storage unit 182 as a combination model. In addition to the cycle and the margin time of a group of formats, a property (for example, a variable value included in a periodic log) of periodic logs corresponding to the group of formats may be used for the definition of a combination model.

In the present example embodiment, while both the simple model and the combination model are generated as cycle models, at least one of the simple model and the combination model may be generated.

Next, the model learning unit 150 generates a general model based on a general log having no periodicity. For example, the general model means that a variable value of a numeric value is within a predetermined range in a format, that a variable value of a character string is a registered value in a format, or the like. The general model is not limited to the above, and any definition may be applied.

FIG. 5B is a schematic diagram of exemplary model information generated by the model learning unit 150. The model information includes a model ID that is an identifier of a model, one or more format IDs, and a cycle and a margin time determined by the cycle determination unit 140. In FIG. 5B, models whose model ID is 1 and a model whose model ID is 3 are simple models, and models whose model ID is 2 and a model whose model ID is 4 are combination models. While including only the cycle model (simple models and combination models), the model information of FIG. 5B may further include a general model. The log anomaly analysis unit 160 described later extracts an abnormal log by determining whether or not a log to be determined conforms to such model information.

The model information illustrated in FIG. 5B is an example and may be recorded in any form. While represented by a list of character strings for better visibility in FIG. 5B, the model information may be represented in any data form (file form), which may be binary data or text data, for example. Further, the model information may be separately recorded in a plurality of files or tables.

The log anomaly analysis unit 160 determines whether or not the log whose format has been determined by the format determination unit 120 is abnormal based on a model prerecorded in the model storage unit 182. Specifically, when a log to be determined does not conform to any of the models in the model storage unit 182, the log anomaly analysis unit 160 determines that the log is abnormal and inputs it to the output unit 170 as an abnormal log. On the other hand, when an input log conforms to any of the models in the model storage unit 182, the log anomaly analysis unit 160 determines that the log is a normal log and does not input it to the output unit 170.

The determination of an abnormal log based on a cycle model (simple model and combination model) performed by the log anomaly analysis unit 160 will be described below. FIG. 6A to FIG. 6C are schematic diagrams of exemplary abnormal logs determined by the log anomaly analysis unit 160. In FIG. 6A to FIG. 6C, the format ID and the time of each abnormal log are indicated, and a message indicated by the abnormal log is omitted.

FIG. 6A is an example of abnormal logs determined as process incompletion. Process incompletion means a state where a part of a process according to a plurality of formats included in the combination model has not been executed. In the example of FIG. 6A, with respect to a model whose model ID of FIG. 5B is 4, while the logs whose format IDs are 344 and 345 were output, the log whose format ID is 346 has not been output. Therefore, since the process of the model whose model ID is 4 is incomplete, the log anomaly analysis unit 160 determines that the logs of FIG. 6A are abnormal logs.

FIG. 6B is an example of abnormal logs determined as process delay. Process delay means a state where the time when a part of a process according to a plurality of formats included in the combination model is performed is delayed. In the example of FIG. 6B, with respect to a model whose model ID of FIG. 5B is 4, while the logs whose format IDs are 344 and 345 were output at the time within a range of the margin time (in this case, 60 minutes), the log whose format ID is 346 was output at the time exceeding a range of the margin time. Note that delay is determined for a case where, out of a plurality of format IDs of a model, a log according to a remaining format ID is not included within a range of the margin time around the time of a log according to the first format ID. Therefore, since the process of the model whose model ID is 4 is delayed, the log anomaly analysis unit 160 determines that logs of FIG. 6B are abnormal logs.

FIG. 6C is an example of abnormal logs determined as a repetition anomaly. A repetition anomaly means a state where a cycle of repetition of a process according to a simple model or a combination model is irregular. In the example of FIG. 6C, with respect to a model whose model ID of FIG. 5B is 2, the logs whose format IDs are 039 and 071 were output in the first round, but only the log whose format ID is 039 was output in the second round and the log whose format ID is 071 has not been output. Note that the N-th round (N is an integer greater than one) is calculated by adding a product of the time of a cycle and N−1 to the time when the log according to a model is first output. Therefore, since the cycle of the process of the model whose model ID is 2 is irregular, the log anomaly analysis unit 160 determines that logs of FIG. 6C are abnormal logs.

Note that, in some case, the log anomaly analysis unit 160 performs determination using the analysis target log 10 which is sequentially input and, in other case, performs determination using the analysis target log 10 which has been accumulated for a predetermined period. In the case of sequential determination, since there is no distinction between process delay and process incompletion at the time of determination, process incompletion can be identified when a predetermined time (for example, twice the margin time) elapses from a state of process delay, for example.

The above determination reference for an abnormal log is an example, and any determination reference may be used as long as an abnormal log can be determined based on a model generated based on the periodicity of a log. Any anomaly may be defined other than process incompletion, process delay, and repetition anomaly.

Further, the log anomaly analysis unit 160 performs determination of an abnormal log based on a general model in addition to the determination of an abnormal log based on a cycle model. For example, when a format ID and a variable value of a log to be determined is not similar to any of the format IDs and variable values of general models recorded in the model storage unit 182, the log anomaly analysis unit 160 determines that the log is an abnormal log.

The output unit 170 outputs an anomaly determination result performed by the log anomaly analysis unit 160. In the present example embodiment, the output unit 170 outputs an anomaly determination result on a display device 20, and the display device displays the anomaly determination result as an image to a user. The display device 20 has a display unit such as a liquid crystal display, a cathode ray tube (CRT) display, or the like used for displaying an image.

FIG. 7 is a schematic diagram illustrating a display window C of an exemplary anomaly determination result using the display device 20. The display window C illustrated in FIG. 7 displays an abnormal log field C1 indicating abnormal logs determined by the log anomaly analysis unit 160, a format ID field C2 indicating the format IDs of the abnormal logs, and an anomaly detail field C3. The anomaly detail field C3 illustrates a reason or details of determination performed by the log anomaly analysis unit 160. For example, the anomaly detail field C3 indicates which of process incompletion, process delay, or repetition anomaly the abnormal log corresponds to and further indicates the model ID, the format ID, the cycle, and the margin time of the model information associated with the abnormal log.

The display window C illustrated in FIG. 7 is an example, and any display scheme may be used as long as information including an anomaly determination result from the log anomaly analysis unit 160 can be displayed in a visible manner to the user. Further, the output scheme of information by the log analysis system 100 (output unit 170) is not limited to the image display to the user. For example, the output unit 170 outputs information to be output as data, and the log analysis system 100 or other systems may perform a recording process, a printing process, an analysis process, a statistics process, or the like on the data from the output unit 170.

Figure 8:
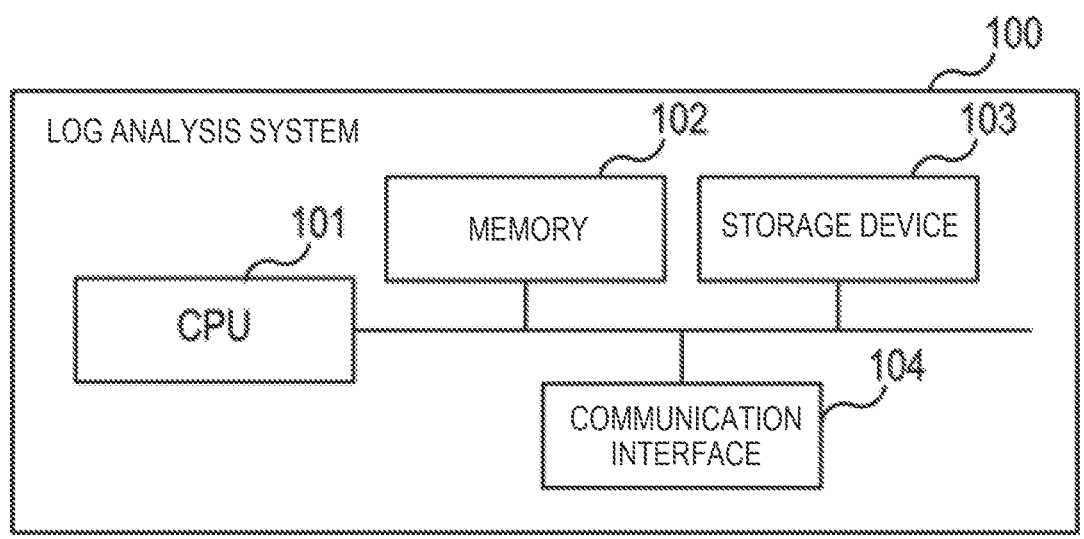
FIG. 8 is a schematic configuration diagram illustrating an exemplary device configuration of a log analysis system according to the first example embodiment.

FIG. 8 is a general configuration diagram illustrating an exemplary device configuration of the log analysis system 100 according to the present example embodiment. The log analysis system 100 has a central processing unit (CPU) 101, a memory 102, a storage device 103, and a communication interface 104. The log analysis system 100 may be connected to the display device 20 via the communication interface 104 or may include the display device 20. The log analysis system 100 can be a standalone device or may be integrally configured with another device.

The communication interface 104 is a communication unit that transmits and receives data and is configured to be able to perform at least one of the communication schemes of wired communication and wireless communication. The communication interface 104 includes a processor, an electric circuit, an antenna, a connection terminal, or the like required for the above communication scheme. The communication interface 104 is connected to a network using the above communication scheme in accordance with signals from the CPU 101 for communication. For example, the communication interface 104 externally receives an analysis target log 10.

The storage device 103 stores a program executed by the log analysis system 100, data resulted from processing by the program, or the like. The storage device 103 includes a read only memory (ROM) that is dedicated to reading, a hard disk drive or a flash memory that is readable and writable, or the like. Further, the storage device 103 may include a computer readable portable storage medium such as a CD-ROM. The memory 102 includes a random access memory (RAM) or the like that temporarily stores data being processed by the CPU 101 or a program and data read from the storage device 103.

The CPU 101 is a processor as a processing unit that temporarily stores transient data used for processing in the memory 102, reads a program stored in the storage device 103, and performs various processing operations such as calculation, control, determination, or the like on the transient data in accordance with the program. Further, the CPU 101 stores data of a process result in the storage device 103 and also transmits the data of the process result externally via the communication interface 104.

The CPU 101 in the present example embodiment functions as the log input unit 110, the format determination unit 120, the temporal distribution acquisition unit 130, the cycle determination unit 140, the model learning unit 150, the log anomaly analysis unit 160, and the output unit 170 of FIG. 1 by executing a program stored in the storage device 103. Further, the storage device 103 in the present example embodiment functions as the format storage unit 181 and the model storage unit 182 of FIG. 1.

The log analysis system 100 is not limited to the specific configuration illustrated in FIG. 8. The log analysis system 100 is not limited to a single device and may be configured such that two or more physically separated devices are connected by wired or wireless connection. Respective units included in the log analysis system 100 may be implemented by electric circuitry, respectively. Electric circuitry here is a term conceptually including a single device, multiple devices, a chipset, or a cloud.

Further, at least a part of the log analysis system 100 may be provided in a form of Software as a Service (SaaS). That is, at least a part of the functions for implementing the log analysis system 100 may be performed by software executed via a network.

A log analysis method using the log analysis system 100 according to the present example embodiment comprises a model learning process of learning a model based on cycle information and an anomaly analysis process of determining an abnormal log using the model generated based on the cycle information. The model information once recorded in the model storage unit 182 by the model learning process can be repeatedly used unless there is a significant change in the components of the system. Thus, the model learning process and the anomaly analysis process may be continuously performed, or multiple times of anomaly analysis processes may be performed after the model leaning process.

Figure 9:
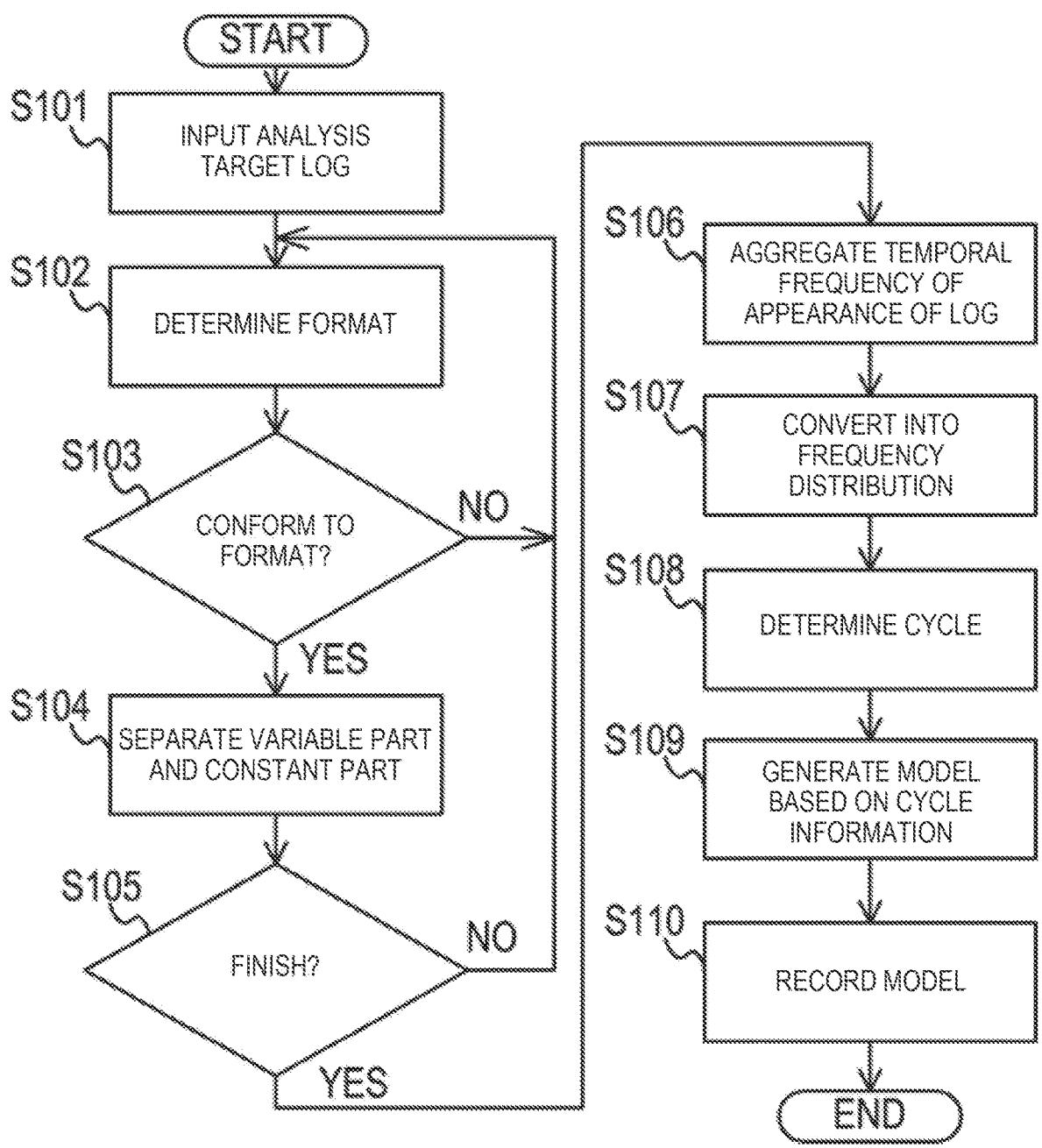
FIG. 9 is a diagram illustrating a flowchart of a model learning process according to the first example embodiment.

FIG. 9 is a diagram illustrating a flowchart of the model learning process according to the present example embodiment. First, the log input unit 110 acquires and inputs the analysis target log 10 to the log analysis system 100 (step S101). The format determination unit 120 designates one log to be determined included in the analysis target log 10 input in step S101 and determines whether or not the designated log conforms to any format recorded in the format storage unit 181 (step S102).

If the log to be determined does not conform to any of the formats recorded in the format storage unit 181 in step S102 (step S103, NO), the next log in the analysis target log 10 is designated as a log to be determined, and steps S102 to S103 are repeated.

If the log to be determined conforms to any format recorded in the format storage unit 181 in step S102 (step S103, YES), the format determination unit 120 uses the format to separate the log to be determined into a variable part and a constant part (step S104). The format determination unit 120 records variable values in the log to be determined.

If the format determination is not finished for all the logs in the analysis target log 10 (step S105, NO), the next log in the analysis target log 10 is designated as a log to be determined, and steps S102 to S105 are repeated.

If the format determination is finished for all the logs in the analysis target log 10 (step S105, YES), the temporal distribution acquisition unit 130 uses the logs whose format have been determined in step S102 to aggregate the temporal frequency of appearance of a log for each format and acquires it as data of a log temporal distribution, or aggregates the frequency of appearance of a log for each combination of a format and a variable and acquires it as data of a log temporal distribution (step S106).

Next, the cycle determination unit 140 converts the log temporal distribution acquired in step S106 into a frequency distribution by FFT or the like (step S107). The cycle determination unit 140 extracts a distinctive frequency component from the frequency distribution obtained in step S107 and converts the frequency component into time to determine the cycle of the log (step S108). The cycle determination unit 140 then acquires data indicating the determined cycle and the margin time determined based on the cycle as cycle information.

Next, the model leaning unit 150 classifies the logs whose formats have been determined in step S102 into a periodic log and a general log based on the cycle information acquired in step S108. The model learning unit 150 then generates a cycle model based on the periodic log having periodicity and generates a general model based on the general log having no periodicity (step S109). The periodic log includes at least one of a simple model defined based on a periodic log according to a single format and a combination model defined based on a periodic log according to a plurality of formats.

Finally, data indicating the cycle model and the general model generated in step S109 is recorded in the model storage unit 182 as model information (step S110).

Figure 10:
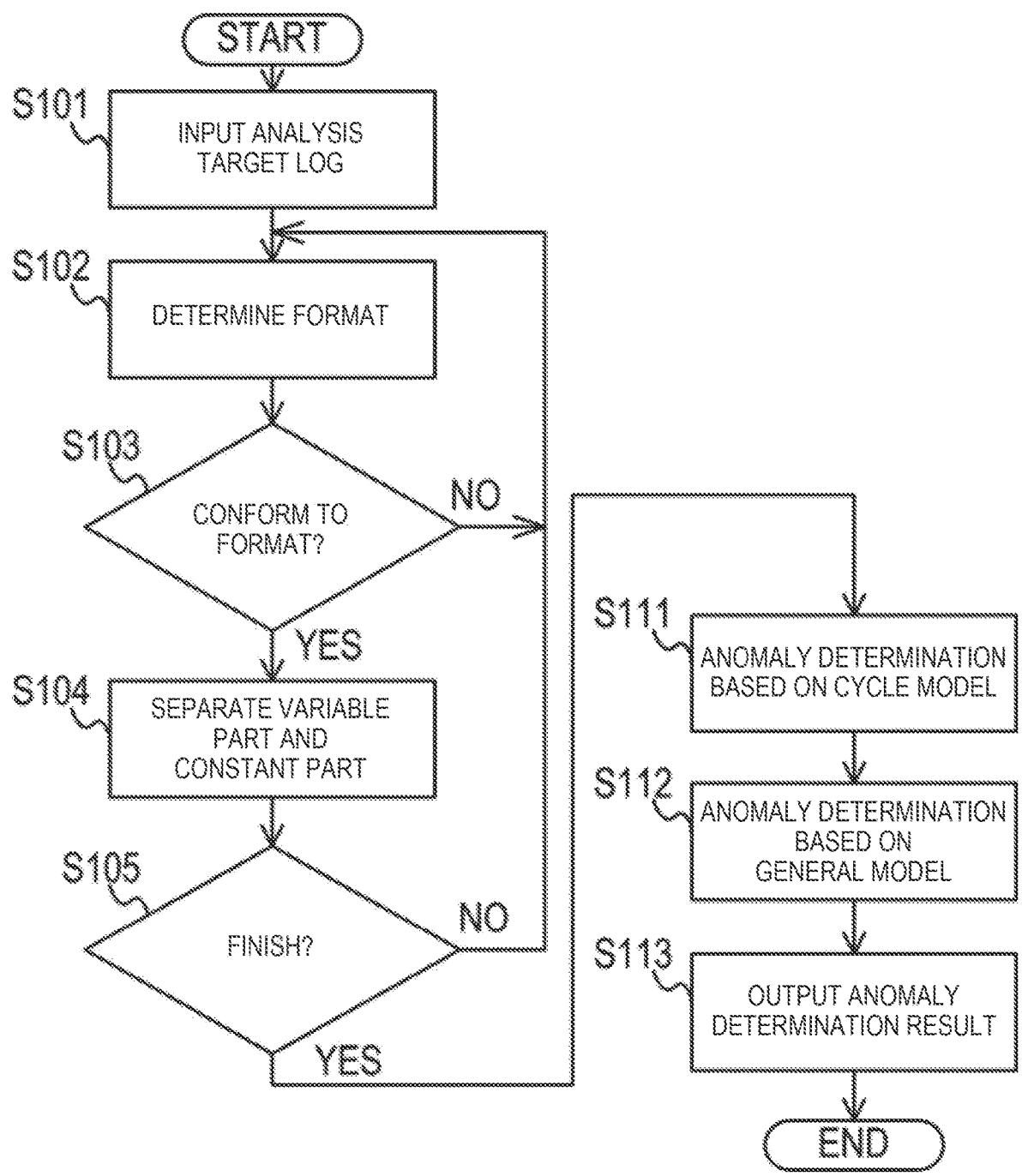
FIG. 10 is a diagram illustrating a flowchart of an anomaly analysis process according to the first example embodiment.

FIG. 10 is a diagram illustrating a flowchart of the anomaly analysis process according to the present example embodiment. The format determination in steps S101 to S105 is similar to the model learning process of FIG. 9. The result of the format determination in steps S101 to S105 performed in the model learning process may be used in the anomaly analysis process, or the format determination of steps S101 to S105 may be performed again in the anomaly analysis process.

Next, the log anomaly analysis unit 160 performs determination of an abnormal log for the log to be determined based on whether or not it conforms to the cycle model recorded in the model storage unit 182 (step S111). Further, the log anomaly analysis unit 160 performs determination of an abnormal log for the log to be determined based on whether or not it conforms to the general model recorded in the model storage unit 182 (step S112). The determination based on the cycle model in step S111 and the determination based on the general model in the step S112 may be performed in any order or may be performed in parallel.

The output unit 170 outputs an anomaly determination results of steps S111 and S112 to the display device 20 (step S113). The display device 20 displays the anomaly determination result using a predetermined window (for example, the display window C of FIG. 7).

The log analysis system 100 according to the present example embodiment generates a model used as a reference of anomaly determination based on a periodic log included in a predetermined time range (margin time) including the time corresponding to the cycle. Thus, even when the periodicity has fluctuation, it is possible to extract the cycle in a more accurate manner and perform anomaly determination based on the periodicity. Further, the log analysis system 100 determines the format of a log to determine the cycle for each format and thus, even when a plurality of cycles are mixed, can extract respective cycles in a separate manner.

Second Example Embodiment

Figure 11:
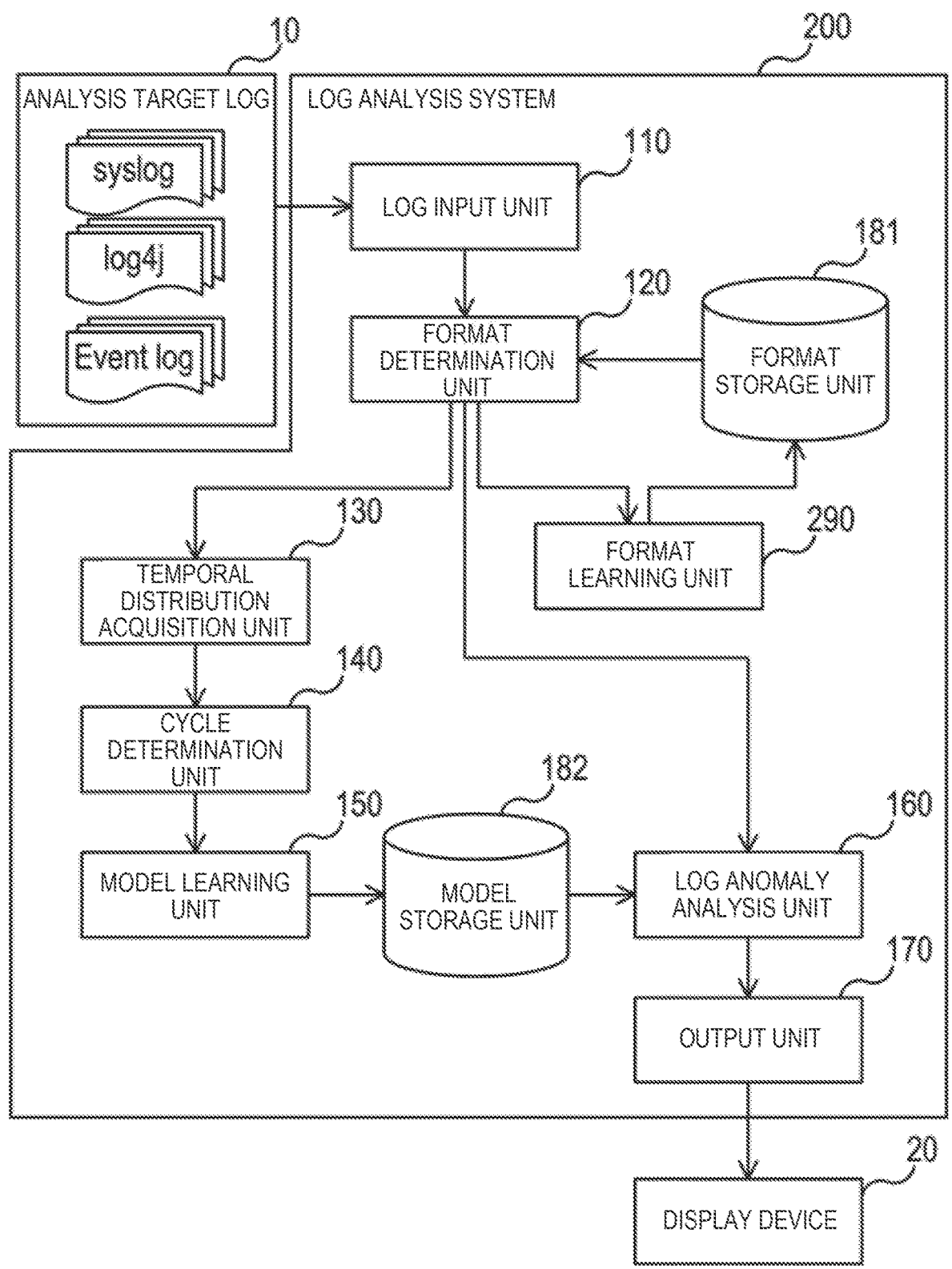
FIG. 11 is a block diagram of a log analysis system according to a second example embodiment.

FIG. 11 is a block diagram of a log analysis system 200 according to the present example embodiment. The log analysis system 200 has a format leaning unit 290 in addition to the configuration of FIG. 1.

When the format determination unit 120 determines the format and when a log to be determined does not conform to any of the formats recorded in the format storage unit 181, the format leaning unit 290 creates a new format and records the new format in the format storage unit 181.

As a first method for the format learning unit 290 to learn a format, the format learning unit 290 can define a new format by accumulating a plurality of logs whose formats are unknown and statistically separating the logs into changeable variable parts and unchangeable constant parts. As a second method for the format learning unit 290 to learn a format, the format learning unit 290 can define a new format by reading a list of known variable values, determining, as a variable part, a part which is the same as or similar to the known variable value out of a log whose format is unknown, and determining other parts as a constant part. A value itself may be used as a known variable value, or a pattern such as normalized expression may be used. The learning method of a format is not limited to the above, and any learning algorithm that can define a new format for an input log may be used.

As discussed above, since the log analysis system 200 has a learning unit for a format, it is possible to newly generate and record a format from a log including unknown format.

Other Example Embodiments

Figure 12:
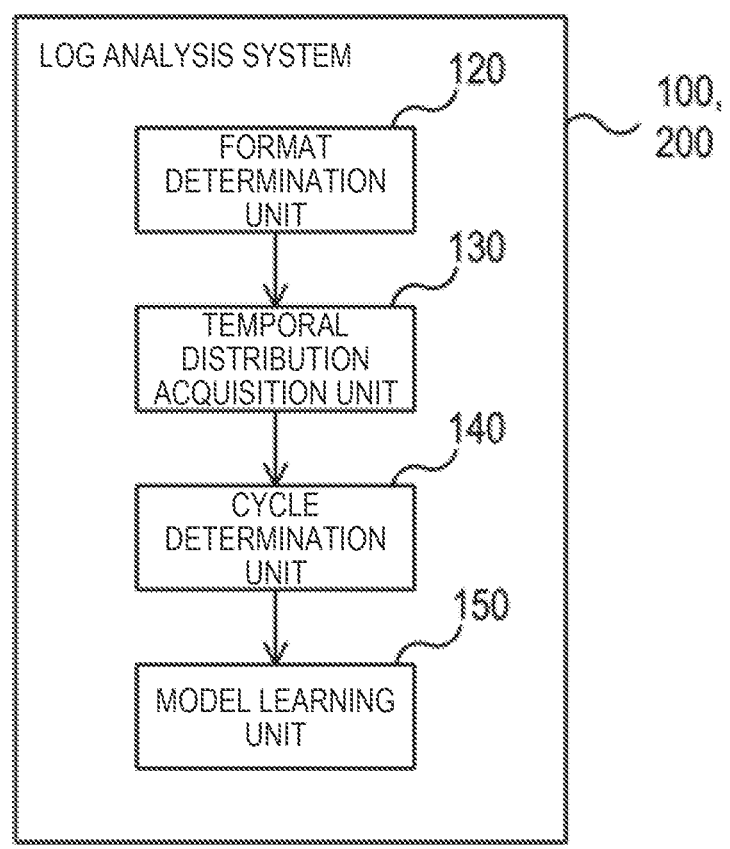
FIG. 12 is a block diagram of a log analysis system according to each example embodiment.

FIG. 12 is a general configuration diagram of each of the log analysis systems 100 and 200 according to each of the example embodiments described above. FIG. 12 illustrates a configuration example by which each of the log analysis systems 100 and 200 functions as a device that learns a model based on the periodicity of a log. Each of the log analysis systems 100 and 200 is a log analysis system for performing analysis of an analysis target log including a periodic log output at a cycle, and the log analysis system includes: a format determination unit 120 as a form determination unit that determines a form of each of logs included in the analysis target log; a temporal distribution acquisition unit 130 that aggregates a temporal frequency of appearance of the logs for each form; a cycle determination unit 140 that determines the cycle for each form based on the temporal frequency of appearance; and a model learning unit 150 as a learning unit that extracts, out of the logs, a log which is included in a time range including the cycle as the periodic log for each form and, based on the form and the cycle of the periodic log, generates information used as a reference as to whether or not the log is abnormal.

The present invention is not limited to the example embodiments described above and can be properly changed within a scope not departing from the spirit of the present invention.

Further, the scope of each of the example embodiments includes a processing method that stores, in a storage medium, a program causing the configuration of each of the example embodiments to operate so as to realize the function of each of the example embodiments described above (more specifically, a program causing a computer to perform the process illustrated in FIG. 9 or FIG. 10), reads the program stored in the storage medium as a code, and executes the program in a computer. That is, the scope of each of the example embodiments includes a computer readable storage medium. Further, each of the example embodiments includes not only the storage medium in which the program described above is stored but also the program itself.

As the storage medium, for example, a floppy (registered trademark) disk, a hard disk, an optical disk, a magneto-optical disk, a CD-ROM, a magnetic tape, a nonvolatile memory card, or a ROM can be used. Further, the scope of each of the example embodiments includes an example that operates on OS to perform a process in cooperation with another software or a function of an add-in board without being limited to an example that performs a process by an individual program stored in the storage medium.

The whole or part of the example embodiments disclosed above can be described as, but not limited to, the following supplementary notes.

(Supplementary Note 1)

A log analysis system for performing analysis of an analysis target log including a periodic log output at a cycle, the log analysis system comprising:

a form determination unit that determines a form of each of logs included in the analysis target log;

a temporal distribution acquisition unit that aggregates a temporal frequency of appearance of the logs for each form;

a cycle determination unit that determines the cycle for each form based on the temporal frequency of appearance; and a learning unit that extracts, out of the logs, a log which is included in a time range including the cycle as the periodic log for each form and, based on the form and the cycle of the periodic log, generates information used as a reference as to whether or not the log is abnormal.

(Supplementary Note 2)

The log analysis system according to supplementary note 1, wherein the learning unit generates the information including the form of the periodic log and the cycle.

(Supplementary Note 3)

The log analysis system according to supplementary note 1 or 2, wherein, when the cycle is the same between a first form of the periodic log and a second form of the periodic log and a correlation of the temporal frequency of appearance is greater than or equal to a predetermined threshold, the learning unit generates the information including a combination of the first form and the second form.

(Supplementary Note 4)

The log analysis system according to any one of supplementary notes 1 to 3, wherein the cycle determination unit determines the cycle by converting the temporal frequency of appearance into a frequency distribution, extracting a peak having an intensity greater than or equal to a predetermined threshold in the frequency distribution, and converting a frequency of the peak into time.

(Supplementary Note 5)

The log analysis system according to any one of supplementary notes 1 to 4, wherein the time range is a range in which a time resulted by subtracting a margin time from a time at the cycle is the earlier limit and a time resulted by adding the margin time to the time at the cycle is the later limit.

(Supplementary Note 6)

The log analysis system according to supplementary note 5, wherein the learning unit generates the information including the form of the periodic log, the cycle, and the margin time.

(Supplementary Note 7)

The log analysis system according to supplementary note 1, wherein the temporal distribution acquisition unit aggregates the temporal frequency of appearance of the logs for each of combinations of the form and a variable value included in the logs, and wherein, based on the temporal frequency of appearance, the cycle determination unit determines the cycle for each of the combinations of the form and the variable value.

(Supplementary Note 8)

A log analysis method for performing analysis of an analysis target log including a periodic log output at a cycle, the log analysis method comprising:

determining a form of each of logs included in the analysis target log;

aggregating a temporal frequency of appearance of the logs for each form;

determining the cycle for each form based on the temporal frequency of appearance; and extracting, out of the logs, a log which is included in a time range including the cycle as the periodic log for each form and, based on the form and the cycle of the periodic log, generates information used as a reference as to whether or not the log is abnormal.

(Supplementary Note 9)

A log analysis program for performing analysis of an analysis target log including a periodic log output at a cycle, the log analysis program causing a computer to execute:

determining a form of each of logs included in the analysis target log;

aggregating a temporal frequency of appearance of the logs for each form;

determining the cycle for each form based on the temporal frequency of appearance; and extracting, out of the logs, a log which is included in a time range including the cycle as the periodic log for each form and, based on the form and the cycle of the periodic log, generates information used as a reference as to whether or not the log is abnormal.

(Supplementary Note 10)

A log analysis system for performing analysis of an analysis target log including a periodic log output at a cycle, the log analysis system comprising:

a storage unit that records information including a form determined from the periodic log included in a time range including the cycle and the cycle;

a log anomaly analysis unit that determines whether or not a log to be determined is abnormal based on the information including the form and the cycle recorded in the storage unit; and an output unit that outputs a determination result obtained by the log anomaly analysis unit.

(Supplementary Note 11)

A log analysis method for performing analysis of an analysis target log including a periodic log output at a cycle, the log analysis method comprising:

acquiring information including a form determined from the periodic log included in a time range including the cycle and the cycle;

determining whether or not a log to be determined is abnormal based on the information including the form and the cycle acquired in the acquiring; and outputting a determination result obtained in the determining by the log anomaly analysis unit.

(Supplementary Note 12)

A log analysis program for performing analysis of an analysis target log including a periodic log output at a cycle, the log analysis program causing a computer to execute:

acquiring information including a form determined from the periodic log included in a time range including the cycle and the cycle;

determining whether or not a log to be determined is abnormal based on the information including the form and the cycle acquired in the acquiring; and outputting a determination result obtained in the determining by the log anomaly analysis unit.

This application is based upon and claims the benefit of priority from Japanese Patent Application No. 2015-255981, filed on Dec. 28, 2015, the disclosure of which is incorporated herein in its entirety by reference.

The invention claimed is:

1. A log analysis system for performing analysis of an analysis target log including a periodic log output at a cycle, the log analysis system comprising:

at least one memory storing instructions;

and at least one hardware processor configured to execute the instructions to implement:

determining a data form of each of logs included in the analysis target log from at least one of an electronic device and a program of the electronic device;

aggregating a temporal frequency of appearance of the logs for each data form;

determining the cycle for each data form based on the temporal frequency of appearance from the at least one of the electronic device and the program of the electronic device;

extracting, out of the logs, a log which is included in a time range including the cycle as the periodic log for each data form and, based on the data form and the cycle of the periodic log, generating information used as a reference as to whether or not the log is abnormal; and determining the cycle by converting the temporal frequency of appearance into a frequency distribution, extracting a peak having an intensity greater than or equal to a predetermined threshold in the frequency distribution, and converting a frequency of the peak into time.

2. The log analysis system according to claim 1, wherein the at least one hardware processor is further configured to execute the instructions to implement generating the information including the data form of the periodic log and the cycle.

3. The log analysis system according to claim 1, wherein the at least one hardware processor is further configured to execute the instructions to implement generating, when the cycle is the same between a first data form of the periodic log and a second data form of the periodic log and a correlation of the temporal frequency of appearance is greater than or equal to a predetermined threshold, the information including a combination of the first data form and the second data form.

4. The log analysis system according to claim 1, wherein the time range is a range in which a time resulted by subtracting a margin time from a time at the cycle is an earlier limit and a time resulted by adding the margin time to the time at the cycle is a later limit.

5. The log analysis system according to claim 4, wherein the at least one hardware processor is further configured to execute the instructions to implement generating the information including the data form of the periodic log, the cycle, and the margin time.

6. The log analysis system according to claim 1, wherein the at least one hardware processor is further configured to execute the instructions to implement:
   aggregating the temporal frequency of appearance of the logs for each of combinations of the data form and a variable value included in the logs, and
   based on the temporal frequency of appearance, determining the cycle for each of the combinations of the data form and the variable value.

7. A log analysis method for performing analysis of an analysis target log including a periodic log output at a cycle, the log analysis method comprising:
   determining a data form of each of logs included in the analysis target log from at least one of an electronic device and a program of the electronic device;
   aggregating a temporal frequency of appearance of the logs for each data form;
   determining the cycle for each data form based on the temporal frequency of appearance from the at least one of the electronic device and the program of the electronic device;
   extracting, out of the logs, a log which is included in a time range including the cycle as the periodic log for each data form and, based on the data form and the cycle of the periodic log, generating information used as a reference as to whether or not the log is abnormal; and
   determining the cycle by converting the temporal frequency of appearance into a frequency distribution, extracting a peak having an intensity greater than or equal to a predetermined threshold in the frequency distribution, and converting a frequency of the peak into time.

8. A log analysis system for performing analysis of an analysis target log including a periodic log output at a cycle from at least one of an electronic device and a program of the electronic device, the log analysis system comprising:
   at least one memory storing instructions; and
   at least one hardware processor configured to execute the instructions to implement:
       recording information including a data form determined from the periodic log included in a time range including the cycle and the cycle;
       determining whether or not a log to be determined is abnormal based on the information including the data form and the cycle;
       outputting a determination result obtained by determining whether or not the log to be determined is abnormal based on the information including the data form and the cycle; and
       determining the cycle by converting the temporal frequency of appearance into a frequency distribution, extracting a peak having an intensity greater than or equal to a predetermined threshold in the frequency distribution, and converting a frequency of the peak into time.

* * * * *